Aug. 21, 1928.

O. P. SMITH 1,681,650

RAIL BRUSH FOR ELECTRIC CARS

Filed March 17, 1927

O. P. Smith
Deceased
By
Hannah M. Smith
Administratrix
By Chester W. Brown
her Attorney Patented Aug. 21, 1928.

1,681,650

UNITED STATES PATENT OFFICE.

OWEN P. SMITH, DECEASED, LATE OF MIAMI, FLORIDA, BY HANNAH M. SMITH, ADMINISTRATRIX, OF MIAMI, FLORIDA.

RAIL BRUSH FOR ELECTRIC CARS.

Application filed March 17, 1927. Serial No. 176,222.

The present invention relates to means for removing from the rails of a rail track upon which a car is being operated, any substance or material which may in any manner interfere with the traction of the wheels of such car upon the rails.

The accompanying drawings show one embodiment of this invention as applied to cars operated upon a rail track where a third rail is located between the traction rails as shown, similar to the style of construction at present employed on tracks for dog racing amusements as shown in former patents to said Owen P. Smith.

The object of the present invention is to provide means attached to and moved with and operated by the movement of the car, which will rotate brushes in contact with the rail track and thereby remove from such rails any substance, as moisture, mud, clay, dust, or other material which may in any manner interfere with the traction of the drive wheels of such car upon such rails.

Another object is to provide means attached to and moving with and operated by the movement of the car, whereby brushes will be rotated in contact with the traction rails and in a direction the reverse of the direction of travel of such car, to remove any substance upon such rails to provide better traction for the drive wheels of such car.

With the above and other objects in view, which will more particularly appear from the accompanying drawings and specifications I have shown in the accompanying drawings one embodiment of the invention as applied to rail tracks constructed for use in dog racing amusements it being apparent that I do not confine myself to that specific construction, as the various parts may be varied to meet other and different constructions without departing from the spirit of the invention. In the accompanying drawings, in which like numerals of reference refer to the same part throughout the various views, Figure 1 is a front elevation of a portion of a car mounted upon a rail track showing the invention operatively attached thereto.

Figure 1:
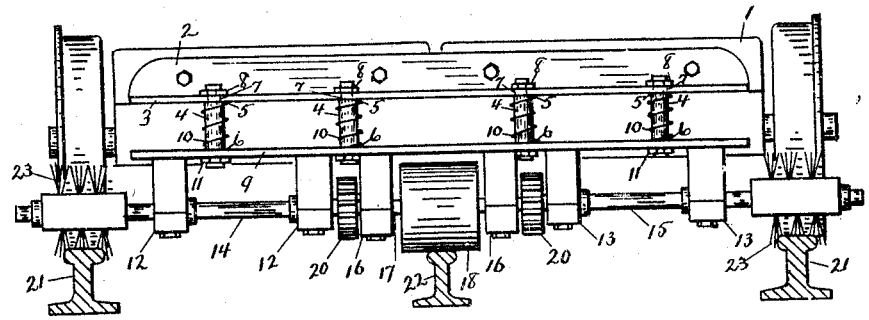
Figure 2:
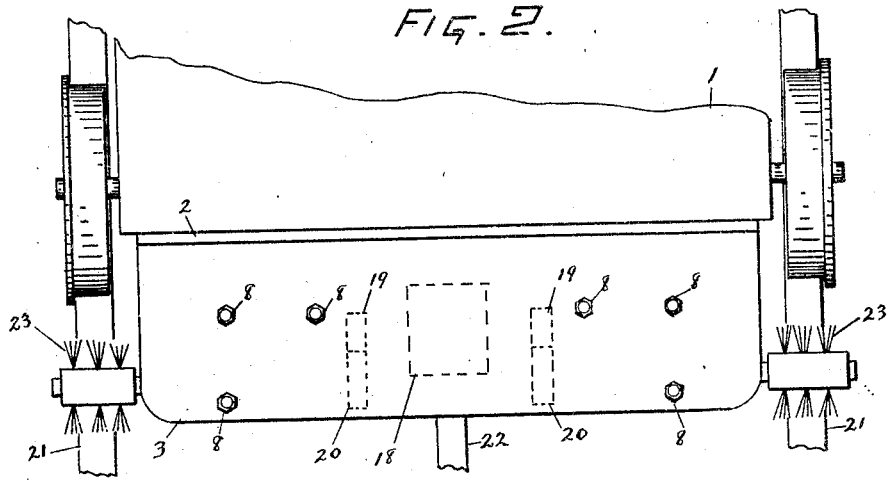
Figure 2 is a top plan view showing a portion of a car having this invention operatively attached thereto.
Figure 3:
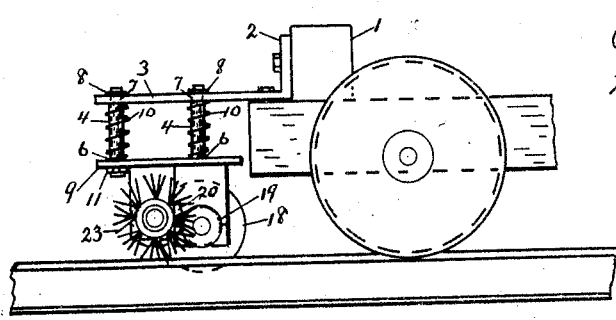
Figure 3 is an end view taken from the right in Figure 1 showing portion of an electric car with this invention attached.

In the illustrations accompanying this specification, there is shown the present invention as employed in connection with the electric car used to carry the "electric rabbit" around the race course in the greyhound dog racing amusement tracks as invented by the said Owen P. Smith. In the operation of these tracks it is imperative that the "electric rabbit" shall be kept in advance of the dogs, and as a consequence, the traction of the drive wheels must be as nearly perfect as possible, as a very slight slipping, or failure to respond to the power applied to the car may permit the dogs to overtake the "rabbit" and ruin the race. As a consequence any substance or material upon the traction rails which causes the drive wheels to slip must be removed, and the present invention is designed to brush from the rail track any such substance or material, and thus lend aid to the successful operation of the cars, and with them the "electric rabbit" and the races.

To accomplish this result there is attached to the electric or other car 1 by means of a bracket as 2 the horizontally disposed plate 3 which supports the working parts hereinafter described. Through the plate 3 are bored a number of holes 7, 7, and through these holes are passed special stud bolts 4, 4, 4, threaded at both ends, and having a shoulder at 5 on each bolt to engage the lower side of the plate 3, as shown, and hold the bolts in a substantially vertical position at right angles to the plate 3. The bolts are held rigidly in said plate 3 by means of the nuts 8, 8, threaded on the upper ends of the bolts 4, 4 above the plate, as shown.

At the lower portions of the bolts 4 they pass loosely through holes 6, 6 in the plate 9 disposed parallel to plate 3 with springs 10, 10 disposed between said plates, and surrounding the bolts, as shown. Nuts 11, 11, are threaded upon the lower ends of the bolts 4, 4, as shown to compress the springs 10, 10 between the two plates, and to hold the lower plate 9 in the desired position relative to plate 2.

To the lower side of the plate 9 are attached suitable bearing lugs 12, 12 and 13, 13 to provide suitable bearings for the shafts 14 and 15 to rotate therein. There are also attached to the lower side of the plate 9 bearing lugs 16, 16 to provide suitable bearings for the shaft 17 to rotate in such bearings. Midway between the lugs 16, 16 and firmly attached to the shaft 17 is mounted the wheel or roller 18, adapted to rotate with said shaft 17. This roller 18 is preferably made of fibre, but may be made of rubber, or any other material suitable for the purpose required. There is also firmly attached to said shaft 17 and preferably at the outer extremities thereof, the spur gears 19, 19 adapted to rotate with said shaft. At the outer ends of the shafts 14 and 15 as shown are firmly attached suitable brushes 23, 23, which brushes may be of any suitable material, as fibre, cane, bristle, steel wire or other material suited for the purpose used. At a suitable portion of the said shafts 14, and 15, preferably at the inner ends thereof, as shown, are attached gears 20, 20, positioned and adapted to mesh with the gears 19, 19 above described, on the shaft 17. 21, 21 indicate the two traction rails upon which the car is operated and between them is shown the third rail 22 by means of which electric current is conducted to the electric motor operating the car.

The operation of the present invention is as follows: The electric car 1 is placed upon the rails 21, 21, with the roller 18 resting upon the third rail 22, and the brushes 23, 23 in position to contact with the rails 21, 21 when rotated, as hereinafter described. As power is applied to the electric car and its moves along the rails in the usual manner, the roller 18 is rotated by friction against the rail 22, and through the shaft 17, gears 19, 19, 20, 20, shafts 14, and 15, the brushes 23, 23 are rotated rapidly, and in a direction the reverse of the direction of travel of the electric car, brushing the rails, and cleaning them free of any substance as moisture, snow, frost, mud, clay, dust or other materials which may interfere with perfect traction of the drive wheels of the car.

While the present invention has been shown as adapted to a rail track where the third rail is located between the traction rails, it may be arranged in any other suitable manner.

The means employed for attaching the operating mechanism to the plate 3, with the compression springs 10, 10 disposed between the plates, forms a "cushion" effect, which holds the roller and brushes in contact with the rails by a spring pressure, and a pressure which readily adapts itself to any unevenness of the rails, and joints and crossovers where the car passes over switches, or sidings in its operation.

While the present construction is shown with the brushes 23, 23 mounted upon separate shafts, it is apparent that they could be mounted in any other desired manner. While I have shown gears as employed for transmitting the motion of the roller shaft 17 to the brush shafts 14 and 15, it will be apparent that any other suitable means of transmitting such movement may be employed, without departing from the spirit of this invention.

Having thus described the present invention, what I claim and desire to secure by Letters Patent, is the following:—

1. In combination with a rail car for operation upon rails, spaced transversely disposed upper and lower plates on the forward end of said car, the upper one of said plates being stationary and the lower one being movable, springs interposed between the upper and lower plates and normally urging the lower plate downwardly, a power shaft carried by the movable plate, driven shafts carried by the same plate and having means thereon for receiving power from the power shaft, brushes on the outer end of each driven shaft yieldingly engaging the rails, and means for rotating the power shaft.

2. In combination with a rail car for operation upon rails, a horizontal plate on the forward end of the car having bolts depending therefrom, a second plate spaced from said first plate and loosely carried on said bolts, compression springs surrounding said bolts and normally urging the plates away from each other, bearings in said second plate, means for rotatably mounting rail engaging brushes in said bearings and means for rotating said brushes in a direction such that their lower portions move in the same direction as that in which the car is travelling.

In testimony whereof, I have hereunto affixed my signature.

HANNAH M. SMITH,
*Administratrix of the Estate of Owen P. Smith, Deceased.*